(12) United States Patent
Schaefer et al.

(10) Patent No.: US 12,367,161 B2
(45) Date of Patent: *Jul. 22, 2025

(54) INDIVIDUALLY ADDRESSING MEMORY DEVICES DISCONNECTED FROM A DATA BUS

(71) Applicant: Lodestar Licensing Group LLC, Evanston, IL (US)

(72) Inventors: Scott E. Schaefer, Boise, ID (US); Matthew A. Prather, Boise, ID (US)

(*) Notice: Subject to any disclaimer, the term of this patent is extended or adjusted under 35 U.S.C. 154(b) by 244 days.

This patent is subject to a terminal disclaimer.

(21) Appl. No.: 17/929,643

(22) Filed: Sep. 2, 2022

(65) Prior Publication Data

US 2022/0414034 A1 Dec. 29, 2022

Related U.S. Application Data

(60) Continuation of application No. 17/207,561, filed on Mar. 19, 2021, now Pat. No. 11,436,169, which is a
(Continued)

(51) Int. Cl.
| | |
|---|---|
| *G11C 5/14* | (2006.01) |
| *G06F 1/3206* | (2019.01) |
| *G06F 1/3234* | (2019.01) |
| *G06F 1/3296* | (2019.01) |
| *G06F 5/06* | (2006.01) |
| *G06F 13/16* | (2006.01) |

(52) U.S. Cl.
CPC ........ *G06F 13/1694* (2013.01); *G06F 1/3206* (2013.01); *G06F 1/3275* (2013.01); *G06F 1/3296* (2013.01); *G06F 5/06* (2013.01); *G06F 13/1678* (2013.01)

(58) Field of Classification Search
CPC . G11C 5/14; G06F 1/3275; G06F 5/06; G06F 3/0635; G06F 13/4081; G06F 11/1068
USPC ........................................................ 365/227
See application file for complete search history.

(56) References Cited

U.S. PATENT DOCUMENTS 6,321,277 B1* 11/2001 Andresen ............ G06F 13/4081
 710/100
6,460,143 B1 10/2002 Howard et al.
(Continued)

OTHER PUBLICATIONS

CN Patent Application No. 201880053634.X—Chinese Office Action and Search Report, dated Jan. 20, 2023, with English translation, 9 pages.
(Continued)

*Primary Examiner* — Jason Lappas

(57) ABSTRACT

Memory devices and methods for operating the same are provided. A memory device can include at least one command contact and at least one data contact. The memory device can be configured to detect a condition in which the at least one command contact is connected to a controller and the at least one data contact is disconnected from the controller, and to enter, based at least in part on detecting the condition, a first operating mode with a lower nominal power rating than a second operating mode. Memory modules including one or more such memory devices can be provided, and memory systems including controllers and such memory modules can also be provided.

16 Claims, 4 Drawing Sheets

Related U.S. Application Data continuation of application No. 16/931,144, filed on Jul. 16, 2020, now Pat. No. 10,983,934, which is a continuation of application No. 16/846,146, filed on Apr. 10, 2020, now Pat. No. 10,754,801, which is a division of application No. 16/014,498, filed on Jun. 21, 2018, now Pat. No. 10,657,081.

(60) Provisional application No. 62/550,483, filed on Aug. 25, 2017.

(56) References Cited

U.S. PATENT DOCUMENTS

| | | | |
|---|---|---|---|
| 6,708,278 B2 | 3/2004 | Howard et al. | |
| 7,848,153 B2 | 12/2010 | Bruennert et al. | |
| 10,657,081 B2* | 5/2020 | Schaefer | G06F 5/06 |
| 10,754,801 B2* | 8/2020 | Schaefer | G06F 5/06 |
| 10,983,934 B2* | 4/2021 | Schaefer | G06F 5/06 |
| 11,436,169 B2* | 9/2022 | Schaefer | G06F 1/3275 |
| 2003/0014677 A1 | 1/2003 | Howard et al. | |
| 2007/0161264 A1 | 7/2007 | Lee et al. | |
| 2008/0147968 A1* | 6/2008 | Lee | G06F 11/1068 |
| | | | 711/E12.008 |
| 2010/0046266 A1 | 2/2010 | Bruennert et al. | |
| 2011/0058439 A1* | 3/2011 | Lee | G11C 8/08 |
| | | | 365/226 |
| 2013/0017735 A1 | 1/2013 | Luo et al. | |
| 2014/0032956 A1 | 1/2014 | De Caro et al. | |
| 2014/0304458 A1 | 10/2014 | Chyan et al. | |
| 2015/0241956 A1 | 8/2015 | De Caro et al. | |
| 2016/0274648 A1 | 9/2016 | Chu | |
| 2016/0292095 A1* | 10/2016 | Hinkle | G06F 3/0635 |
| 2019/0065416 A1 | 2/2019 | Schaefer et al. | |
| 2020/0242057 A1 | 7/2020 | Schaefer et al. | |
| 2020/0349097 A1 | 11/2020 | Schaefer et al. | |
| 2021/0209039 A1 | 7/2021 | Schaefer et al. | |

OTHER PUBLICATIONS

EP Patent Application No. 18848839.9—Extended European Search Report, dated Mar. 29, 2021, 6 pages.

International Application No. PCT/US2018/042101—International Search Report and Written Opinion, mailed Nov. 27, 2018, 12 pages.

KR Patent Application No. 10-2020-7008535—Korean Office Action and Search Report, dated Jul. 14, 2021, with English Translation, 14 pages.

\* cited by examiner

INDIVIDUALLY ADDRESSING MEMORY DEVICES DISCONNECTED FROM A DATA BUS

CROSS-REFERENCE TO RELATED APPLICATIONS

This application is a continuation of U.S. application Ser. No. 17/207,561, filed Mar. 19, 2021; which is a continuation of U.S. application Ser. No. 16/931,144, filed Jul. 16, 2020, now U.S. Pat. No. 10,983,934; which is a continuation of U.S. application Ser. No. 16/846,146, filed Apr. 10, 2020, now U.S. Pat. No. 10,754,801; which is a division of U.S. application Ser. No. 16/014,498, filed Jun. 21, 2018, now U.S. Pat. No. 10,657,081; which claims the benefit of U.S. Provisional Application No. 62/550,483, filed Aug. 25, 2017; each of which is incorporated herein by reference in its entirety.

TECHNICAL FIELD

The present disclosure generally relates to memory devices and, more particularly, relates to methods for individually addressing memory devices disconnected from a data bus and memory devices employing the same.

DETAILED DESCRIPTION

In the following description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with semiconductor devices are not shown, or are not described in detail, to avoid obscuring other aspects of the technology. In general, it should be understood that various other devices, systems, and methods in addition to those specific embodiments disclosed herein may be within the scope of the present technology.

Memory modules can include multiple memory devices for providing storage or working memory to a connected host device. Memory modules are frequently provided with a connector (e.g., the edge connector of a dual inline memory module (DIMM)), in which a number of command/address contacts are shared by the memory devices, and a number of data contacts are uniquely coupled to data contacts on the memory devices. The number of data contacts on the connector of a memory module usually corresponds to the data bus width of the memory module. Different memory controllers are configured with support for different data bus widths, and are usually connected to memory modules with a data bus width that matches that of the memory controller. If a memory module has a greater data bus width than a data bus width of a controller to which it is connected, some of the memory devices on the memory module may not be connected to the data bus of the memory controller. Not only can this arrangement prevent data transfer to and from the memory devices on the memory module that lack a data connection to the controller, but as memory devices may rely upon signals received at the data contacts thereof to individually target the memory devices for various commands (e.g., a command to enter a reduced-power mode, to change termination impedance, etc.), this arrangement prevents communication of targeted commands to the memory devices so disconnected. Accordingly, a way to individually target memory devices on a memory module for particular commands, even in the absence of a data connection to a memory controller, are desired.

Several embodiments of the present technology are directed to memory devices, systems including memory devices, and methods of operating memory devices. In one embodiment, a memory device comprises a memory array, at least one command contact, and at least one data contact. The memory device is configured to detect a condition in which the at least one command contact is connected to a controller and the at least one data contact is disconnected from the controller, and in response to the detected condition, enter a reduced-power mode.

Figure 1:
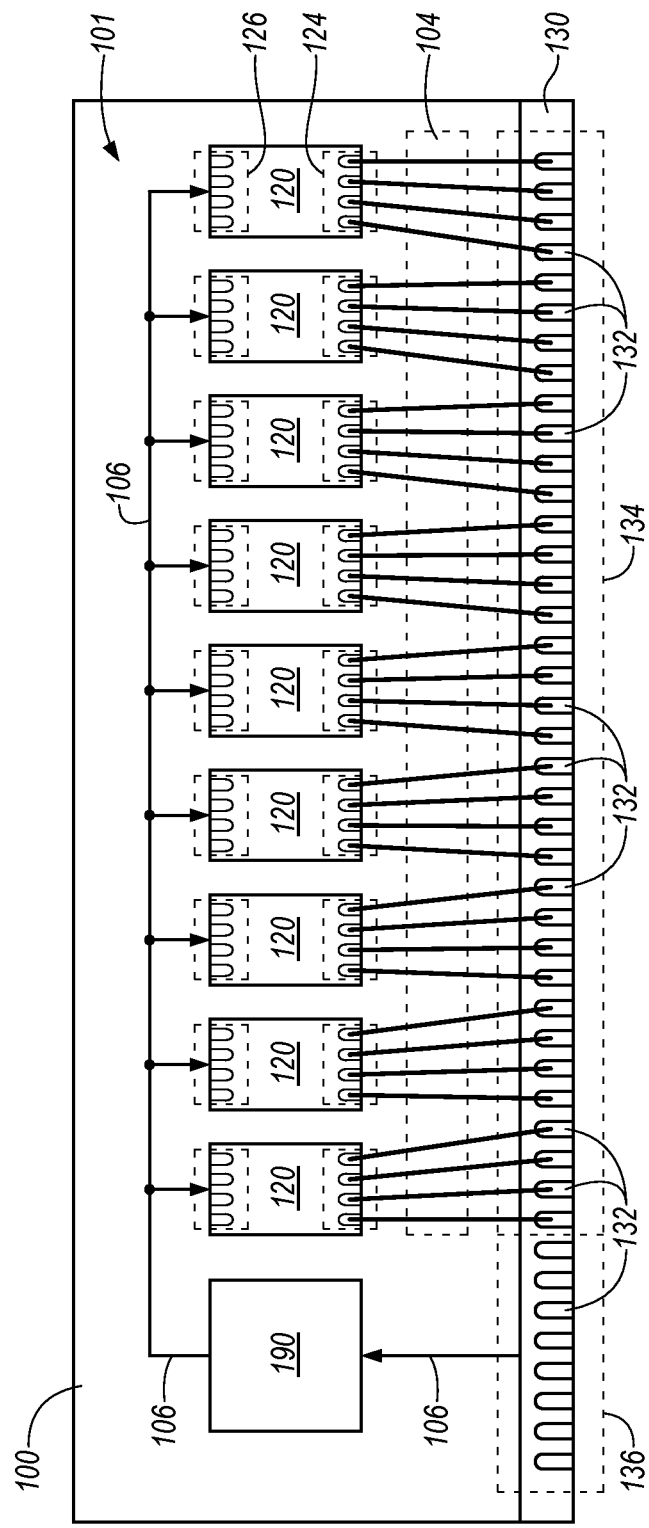
FIG. 1 is a schematic diagram of a memory module in accordance with an embodiment of the present technology.

FIG. 1 schematically illustrates a memory module 100 including a plurality of memories 120 (e.g., memory dies, memory chips, memory packages or the like) in accordance with an embodiment of the present technology. The module 100 includes an edge connector 130 with a number of connector contacts 132 (e.g., connector data contacts 134 and connector command/address contacts 136) along an edge of a substrate 101 (e.g., a printed circuit board (PCB) or the like) of the module 100 for connecting a data bus 104 and a command/address bus 106 to a host device. The data bus 104 connects the memories 120 to the edge connector 130 and receives data signals from and transmits data signals to a connected host during memory access operations (e.g., reads and writes). The module 100 can further include control circuitry (e.g., including a registering clock driver (RCD) 190) that receives command/address signals from the command/address bus 106 and generates memory command/address signals for the memories 120. The RCD 190 can present a predictable electrical load (e.g., for matching impedance, reactance, capacitance, etc.) to the host device and can re-drive memory command/address signals to the memories 120, which helps enable higher densities and increase signal integrity. The RCD 190 may also buffer the command/address signals provided by the host, and then transmit the buffered signals as memory command/address signals to the memories 120.

Each of the memories 120 can include a plurality of memory regions, which can each include a plurality of memory cells. The memories 120 can be individual memory dies, memory planes in a single memory die, a stack of memory dies vertically connected with through-silicon vias (TSVs), or the like. For example, in one embodiment, each of the memories can be formed from a semiconductor die and arranged with other memory dies in a single device package (not shown). In other embodiments, multiple memories 120 can be co-located on a single die and/or distributed across multiple device packages. The memory cells can include, for example, volatile memory cells, such as DRAM or SRAM cells. In another embodiment, floating gate, charge trap, phase change, ferroelectric, magnetoresistive, and/or other suitable storage elements configured to store data persistently or semi-persistently. The memories 120 can also include other circuit components (not shown), such as multiplexers, decoders, buffers, read/write drivers, address registers, data out/data in registers, etc., for accessing and/or programming (e.g., writing) the memory cells and other functionality, such as for processing information and/or communicating with a connected controller.

Each of the memories 120 can include a number of data contacts 124 and a number of command/address contacts 126. Each of the connector command/address contacts 136 can be connected to one or more of the command/address contacts 126 (e.g., in either a one-to-one arrangement or a one-to-many arrangement). The connector command/address contacts 136 can include one or more command contacts, such as strobe contacts (e.g., row access strobe (RAS), column access strobe (CAS), data strobes (DQS), etc.), clock contacts (e.g., CK, CK #), enable contacts (e.g., clock enable (CKE), chip enable (CE), bank enable (BE), write enable (WE), etc.), masks (e.g., data mask (DM), etc.), address contacts (e.g., row address, column address, bank address, etc.), and the like, as is well known to those skilled in the art. The connector contacts 132 can further include power and ground contacts, which may in some embodiments be included in the command/address contacts 136, and in other embodiments may be considered as separate contacts. Each of the connector data contacts 134 can be connected to a separate one of the data contacts 124 (e.g., in a one-to-one arrangement). The number of data contacts 124 is thus equal to the number of connector data contacts in the module, and represents a width of the data bus 104 that can be utilized to provide data to and from all of the memories 120.

Different memory controllers may be provided with different data bus widths, and it may be desirable for a memory module to be optimized for use with multiple different memory controller designs. For example, a DDR4 memory controller may have a data bus width of 72 bits (e.g., corresponding to nine memories 120 with four data contacts 124 each), while a DDR5 memory controller may have a larger data bus width (e.g., 80 bits, corresponding to ten memories 120 with four data contacts 124 each). If a memory module has more connector data contacts 134 than the controller to which it is connected has data bus width, some of the memories 120 may have data contacts 124 that are inaccessible to the controller.

Figure 2:
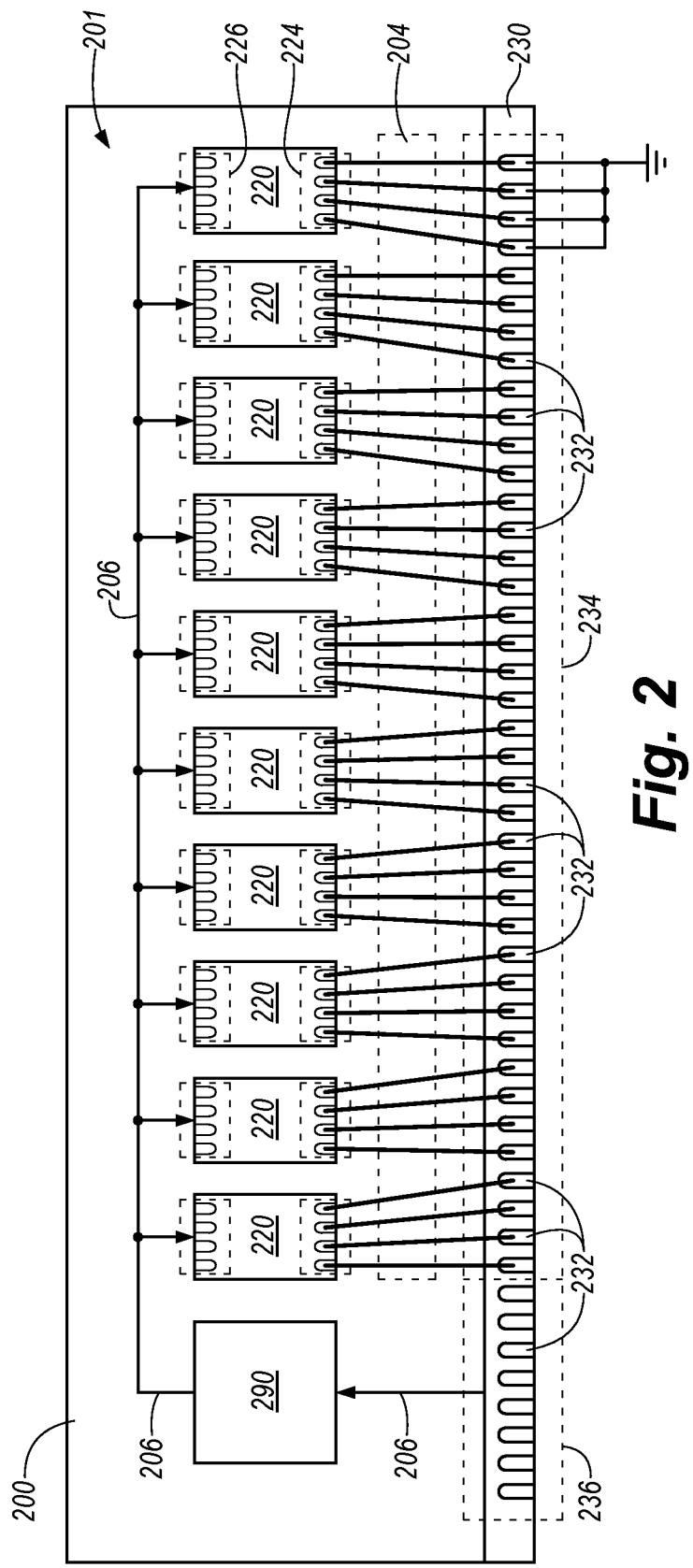
FIG. 2 is a schematic diagram of a memory module in accordance with an embodiment of the present technology.

For example, FIG. 2 illustrates a memory module 200 including a plurality of memories 220 in accordance with an embodiment of the present technology. The module 200 includes an edge connector 230 with a number of connector contacts 232 (e.g., connector data contacts 234 and connector command/address contacts 236) along an edge of a substrate 201 (e.g., a printed circuit board (PCB) or the like) of the module 200 for connecting a data bus 204 and a command/address bus 206 to a host device. The data bus 204 connects the memories 220 to the edge connector 230 and receives data signals from and transmits data signals to a connected host during memory access operations (e.g., reads and writes). The module 200 can further include control circuitry (e.g., including a registering clock driver (RCD) 290) that receives command/address signals from the command/address bus 206 and generates memory command/address signals for the memories 220. The RCD 290 can present a predictable electrical load (e.g., for matching impedance, reactance, capacitance, etc.) to the host device and can re-drive memory command/address signals to the memories 220, which helps enable higher densities and increase signal integrity. The RCD 290 may also buffer the command/address signals provided by the host, and then transmit the buffered signals as memory command/address signals to the memories 220.

Each of the memories 220 can include a number of data contacts 224 and a number of command/address contacts 226. Each of the connector command/address contacts 236 can be connected to one or more of the command/address contacts 226 (e.g., in either a one-to-one arrangement or a one-to-many arrangement). The connector command/address contacts 236 can include one or more command contacts, such as strobe contacts (e.g., row access strobe (RAS), column access strobe (CAS), data strobes (DQS), etc.), clock contacts (e.g., CK, CK #), enable contacts (e.g., clock enable (CKE), chip enable (CE), bank enable (BE), write enable (WE), etc.), masks (e.g., data mask (DM), etc.), address contacts (e.g., row address, column address, bank address, etc.), and the like, as is well known to those skilled in the art. The connector contacts 232 can further include power and ground contacts, which may in some embodiments be included in the connector command/address contacts 236, and in other embodiments may be considered as separate contacts. Each of the connector data contacts 234 can be connected to a separate one of the data contacts 224 (e.g., in a one-to-one arrangement). The number of data contacts 224 is thus equal to the number of connector data contacts in the module, and represents a width of the data bus 204 that can be utilized to provide data to and from all of the memories 220.

As can be seen with reference to FIG. 2, when the memory device 200 is connected to a controller (e.g., via edge connector 230) which has less data bus width than required to individually address each of the memories 220, the connector data contacts 234 for which no data bus lines is available can be connected to a common ground (e.g., rather than being left to float). In memory protocols, such as a DDR DRAM memory protocol, in which per-DRAM addressability (PDA) is dependent upon sending signals to individual ones of the memories 220 via both the data contacts 224 and the command/address contacts 226 of the memory, the disconnection of the data contacts 224 from the controller renders the memory 220 so disconnected un-addressable for a PDA command. Connecting the connector data contacts 234 for which no connection to the controller is available (e.g., due to the limited data bus width of the controller) to a common ground can allow the memory 220 coupled to these connector data contacts 234 to detect that it is not individually addressable by the controller (e.g., even though the command/address bus 206 is still connected to the memory 220 by the shared and/or unique command/address connector contacts 236). By including logic circuitry in the memory 220 that can detect the ground connection of the data contacts 224 (via the connector data contacts 234 being grounded), the memory 220 so disconnected from the controller can be configured to place itself into a reduced-power state (e.g., a state in which the memory 220 no longer actively "listens" to the command/address bus 206). The reduced-power state, which may also be referred to as a reduced-power mode, may thus be a first operating mode with a lower nominal power rating, power requirement, power usage, or power draw than a second operating mode. In some examples, a first operating mode may be the reduced-power mode and a second operating mode may be a normal, typical, or full-power mode.

For example, the memory 220 can be configured with circuitry to detect a condition in which a controller is connected to the command/address contacts 226 of the memory 220, and the data contacts 224 of the memory 220 are disconnected from the controller. One such circuit can be configured to detect a "reset" signal on the command/address bus 206 simultaneously with (e.g., or shortly before or shortly after) the voltage on the data contacts 224 of the memory are determined to be held low (e.g., below a reference voltage level).

In another embodiment, rather than detecting a ground connection at the data contacts 224 of the memory 220, the memory 220 can be configured to detect a condition in which a controller is connected to the command/address contacts 226 of the memory 220, and the data contacts 224 of the memory 220 are disconnected from the controller by exploiting the independently addressable command/address contacts 226 on the memory 220. For example, when the command/address contacts 226 on the memory 220 include data strobe connections (e.g., DQS and DOS #), a connected controller can be configured to hold these two connections at opposing high and low values (rather than strobing them complementarily). As a connected first-in first-out (FIFO) counter of the memory 220 may rely upon the strobing of the DQS and DOS #connections to advance the FIFO counter value, the memory 220 may be configured to evaluate the FIFO counter to determine if the value thereof is below a predetermined threshold. Such a determination, possibly in combination with another signal on the command/address bus (e.g., a "reset" command or a PDA command), can trigger the memory 220 to enter a reduced-power mode.

Although in the foregoing embodiments, memory devices have been described as entering a reduced-power mode in response to detecting a condition in which the memory devices are connected by a command/address bus to a controller, but disconnected from the data bus thereof, in other embodiments, such a detection can trigger other responses from the memory devices besides entering a reduced-power mode. For example, it may be desirable to send other commands to a memory device in a memory module that is not accessible via a data bus, such as commands to adjust an on-die termination level thereof (e.g., for impedance matching).

Figure 3:
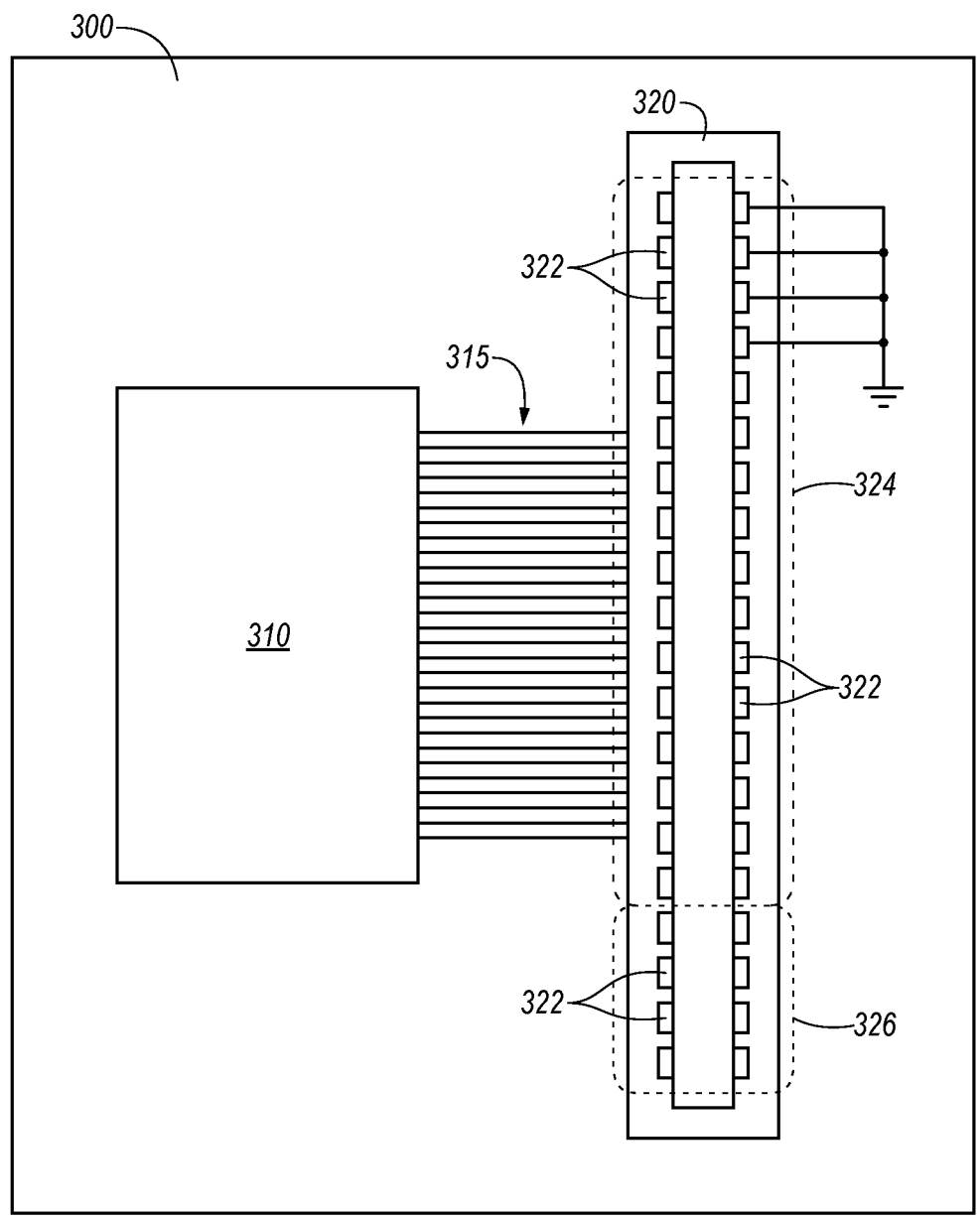
FIG. 3 is a schematic diagram of a memory system in accordance with an embodiment of the present technology.

FIG. 3 illustrates a memory system in accordance with one embodiment of the present technology. Memory system 300 includes a controller 310 and a memory interface 320 (e.g., a DIMM slot) coupled to the memory controller (e.g., by memory bus 315). The memory interface 320 is configured to receive a connector of a memory device (e.g., an edge connector of a DIMM). The memory interface 320 includes a plurality of memory interface contacts 322, including memory interface data contacts 324 and memory interface command/address contacts 326. The memory interface contacts 322 are configured to connect to connector contacts of the connector of the memory device. The memory interface command/address contacts 326 are configured to connect to connector command/address contacts of the memory device, and the memory interface data contacts 324 are configured to connect to connector data contacts of the memory device. One or more of the memory interface data contacts 324 can be electrically disconnected from the memory controller (e.g., not connected to the memory bus 315), but instead coupled to a common electrical ground. As can be seen with reference to FIG. 3, four of the memory interface data contacts 324 have been grounded and disconnected from the memory bus 315 and from the controller 310.

A memory interface 320 so configured can allow memory devices with different data bus widths to be connected to the same controller, and optimized for improved power consumption. As set forth above, grounding the data connects of a memory device can be used by the memory device (e.g., one or more DRAM devices on a DIMM) to detect a condition in which data transfer between the memory device and the controller 310 is precluded. In response to such a detection, the memory device can enter a reduced-power state (or another mode, such as an on-die termination mode of one or more predetermined impedances) to reduce the power consumption of the memory system 300.

The memory system 300 can be connected to a host device, or be incorporated as part of a host device. The host device can be any one of a number of electronic devices capable of utilizing memory for the temporary or persistent storage of information, or a component thereof. For example, host device may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to a memory module or a memory device, although in other embodiments, the host device may be indirectly connected to the memory module or the memory device (e.g., over a networked connection or through intermediary devices).

Figure 4:
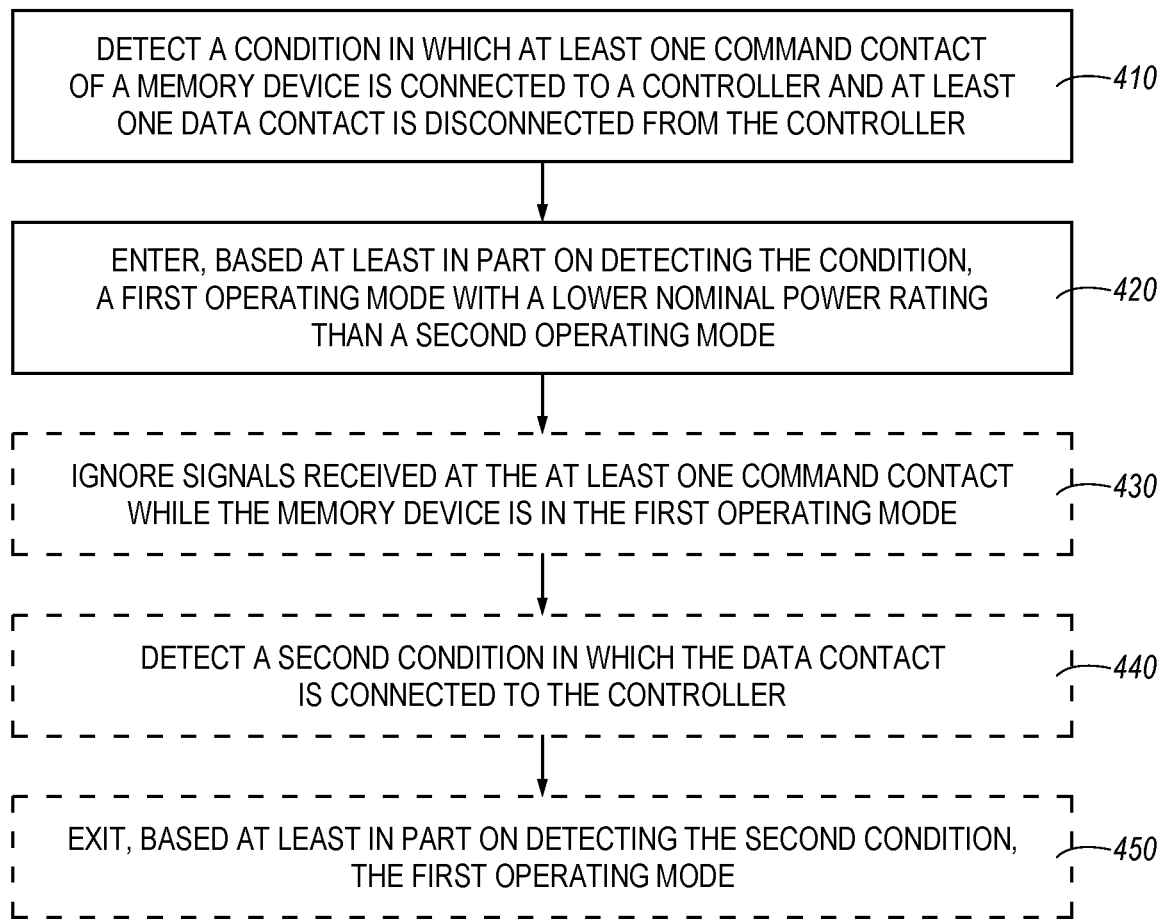
FIG. 4 is a flow chart illustrating a method of operating a memory device in accordance with an embodiment of the present technology.

FIG. 4 is a flow chart illustrating a method of operating a memory device in accordance with an embodiment of the present technology. The method includes detecting a condition in which at least one command contact of the memory device is connected to a controller and at least one data contact is disconnected from the controller (box 410). The method further includes entering, based at least in part on detecting the condition, a first operating mode with a lower nominal power rating than a second operating mode (box 420).

In accordance with one aspect, detecting the condition can include detecting a command signal (e.g., a reset signal or the like) at the at least one command contact and determining that the at least one data contact is grounded. The detecting and determining can be performed simultaneously, or sequentially in either order. In accordance with another aspect, the at least one command contact includes a first strobe contact and a second strobe contact, and detecting the condition includes determining that the first and second strobe contacts are driven to opposing high and low levels. For example, in an embodiment in which the first strobe contact and the second strobe contact are coupled to a first-in first-out (FIFO) counter, determining that the first and second strobe contacts are driven to opposing high and low levels can include determining that the FIFO counter is below a predetermined threshold.

The method can optionally further include ignoring signals received at the at least one command contact while the memory device is in the first operating mode (box 430). Moreover, the method can optionally further include detecting a second condition in which the data contact is connected to the controller (box 440), and exiting, based at least in part on detecting the second condition, the first operating mode (box 450).

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A memory module, comprising:
   a plurality of memories, each of the plurality of memories including at least one data contact,
   wherein at least one of the plurality of memories is configured to:
      detect a condition in which the at least one data contact thereof is disconnected from a controller, and
      perform an action based at least in part on detecting the condition, wherein the action includes changing an on-die termination level.

2. The memory module of claim 1, wherein the action includes entering a mode in which signals received from the controller are ignored.

3. The memory module of claim 1, wherein the condition is a first condition and the action is a first action, and wherein the at least one of the plurality of memories is configured to perform a second action based at least in part upon detecting a second condition in which the at least one data contact is connected to the controller.

4. The memory module of claim 1, further comprising:
   a connector having:
      a plurality of connector data contacts, each of the plurality of connector data contacts coupled to a corresponding one of the at least one data contact of one of the plurality of memories.

5. The memory module of claim 4, wherein the connector is a DIMM connector.

6. The memory module of claim 1, wherein each of the plurality of memories is coupled to a common command/address bus of the memory module.

7. The memory module of claim 1, wherein the at least one of the plurality of memories of the memory module is configured to detect the condition by detecting that the at least one data contact is grounded.

8. The memory module of claim 1, wherein each of the plurality of memories further includes a first strobe contact and a second strobe contact, and wherein the at least one of the plurality of memories is configured to detect the condition based at least in part on determining that the first strobe contact and the second strobe contact are driven to opposing high and low levels.

9. The memory module of claim 8, wherein the first strobe contact and the second strobe contact are coupled to a first-in first-out (FIFO) counter, and wherein determining that the first strobe contact and the second strobe contact are driven to the opposing high and low levels includes determining that the FIFO counter is below a predetermined threshold.

10. The memory module of claim 1, wherein the memory module is a DIMM.

11. A memory system, comprising:
    a controller; and
    at least one memory module coupled to the controller, the at least one memory module including a plurality of memories, each of the plurality of memories including at least one data contact,
       wherein at least one of the plurality of memories is configured to:
          detect a condition in which the at least one data contact thereof is disconnected from the controller, and
          perform an action based at least in part on detecting the condition, wherein the action includes changing an on-die termination level.

12. The memory system of claim 11, wherein the action includes entering a mode in which signals received from the controller are ignored.

13. The memory system of claim 11, wherein the condition is a first condition and the action is a first action, and wherein the at least one of the plurality of memories is configured to perform a second action based at least in part upon detecting a second condition in which the at least one data contact is connected to the controller.

14. The memory system of claim 11, wherein the controller includes a plurality of controller data contacts insufficient in number to be uniquely coupled to the at least one data contact of each of the plurality of memories of the at least one memory module.

15. A method of operating a memory module including a plurality of memories, the method comprising:
    detecting a condition in which at least one data contact of a first memory of the plurality of memories is disconnected from a controller; and
    based at least in part on detecting the condition, performing an action with the first memory, wherein the action includes changing an on-die termination level of the first memory.

16. The method of claim 15, wherein the action includes entering the first memory into a mode in which signals received from the controller are ignored.

* * * * *